United States Patent [19]

Laderman et al.

[11] Patent Number: 4,538,635
[45] Date of Patent: Sep. 3, 1985

[54] LASER BEAM DUCT PRESSURE CONTROLLER SYSTEM

[75] Inventors: Arnold J. Laderman, Laguna Beach; Frederick M. Bergthold, Jr., Tustin, both of Calif.

[73] Assignee: The United States of America as represented by the Secretary of the Air Force, Washington, D.C.

[21] Appl. No.: 539,352

[22] Filed: Oct. 6, 1983

[51] Int. Cl.³ .................................................. H01S 3/03
[52] U.S. Cl. ...................................... 137/114; 372/58
[58] Field of Search ............................ 137/114; 372/58

[56] References Cited

U.S. PATENT DOCUMENTS

| | | | |
|---|---|---|---|
| 3,367,256 | 2/1968 | Townsend et al. | 137/114 |
| 3,441,045 | 4/1969 | Malone | 137/114 |
| 3,875,531 | 4/1975 | Buczek et al. | 331/94.5 G |
| 3,876,957 | 4/1975 | Thatcher | 331/94.5 T |
| 3,898,584 | 8/1975 | Born | 331/94.5 G |
| 3,919,662 | 11/1975 | Born | 331/94.5 G |
| 4,348,764 | 9/1982 | Cavalleri et al. | 372/58 |
| 4,360,922 | 11/1982 | Kulkarny | 372/59 |

Primary Examiner—Martin P. Schwadron
Assistant Examiner—James R. Shay
Attorney, Agent, or Firm—Donald J. Singer; Frank J. Lamattina

[57] ABSTRACT

A laser beam duct pressure controller system for maintaining a spatially uniform pressure in a flowing gas volume which is subjected to temporal pressure variations. This desired result is accomplished, with cooperating structural components (and gases therein) which eliminate the axial flow of a conditioning gas within the laser beam duct, by matching the time rate of change of the pressure of the flowing conditioning gas to the time rate of change of the pressure in the cavity of an operably associated laser beam turret.

4 Claims, 1 Drawing Figure

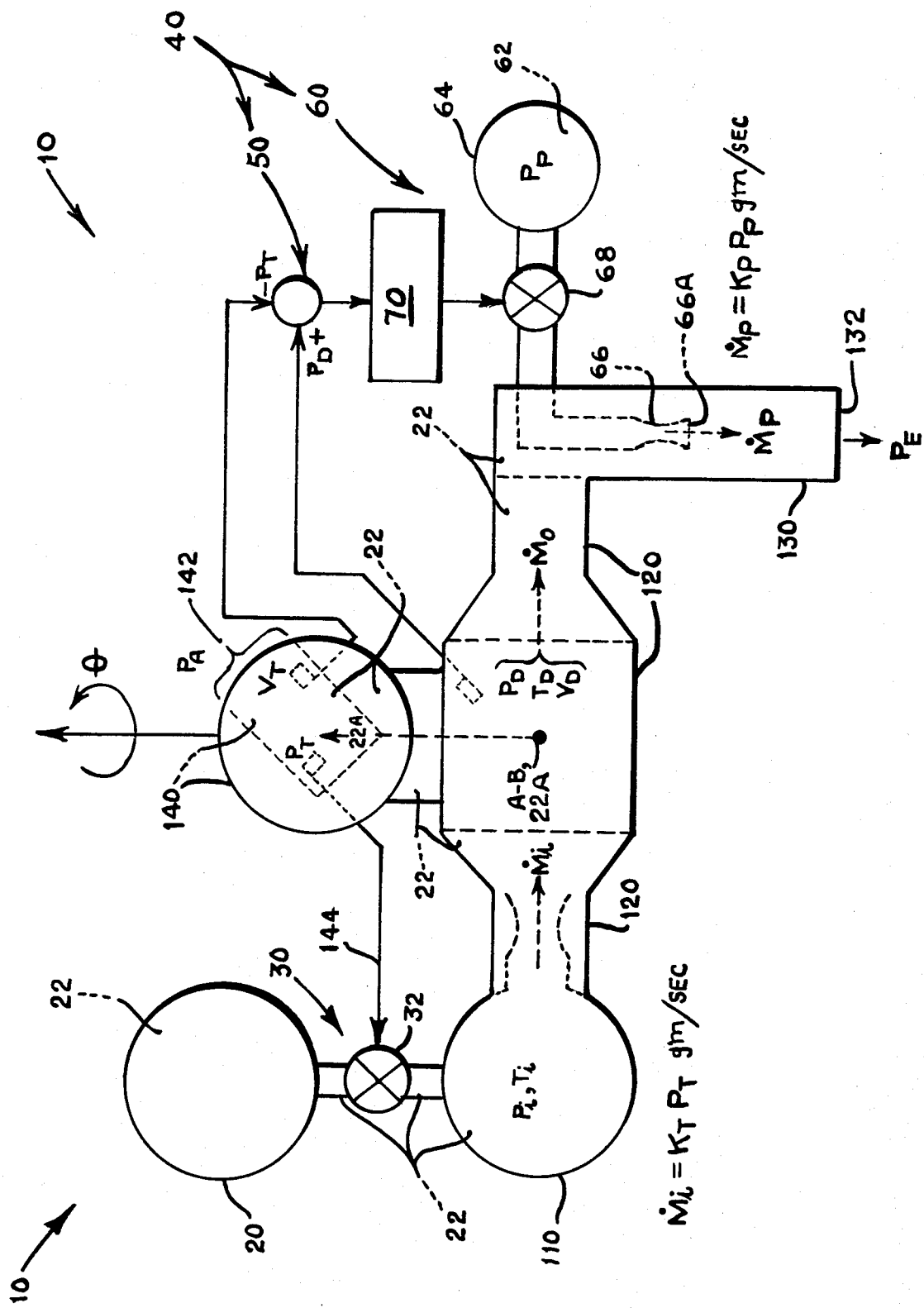

LASER BEAM DUCT PRESSURE CONTROLLER SYSTEM

STATEMENT OF GOVERNMENT INTEREST

The invention described herein may be manufactured and used by or for the Government for governmental purposes without the payment of any royalty thereon.

BACKGROUND OF THE INVENTION

The instant invention relates to a laser beam duct pressure controller system and more particularly to a pressure control system for maintaining a spatially uniform pressure in a flowing gas volume which is subjected to temporal pressure variations.

For the typical airborne laser system, the laser telescope, or beam extender, is located within a rotatable turret which is mounted external of the aircraft, and the laser beam exits through an opening, or aperture, in the turret side wall. The output from the laser device, which is carried inboard of the aircraft, is relayed to the beam expander through an enclosed laser beam duct which is purged by a flow of conditioning gas, in order to minimize optical distortions along the beam path. At least a portion of the lasr beam duct communicates directly with the turret compartment (i.e., cavity or void in the turret), which, in turn, senses the local external pressure through the turret aperture. As the laser telescope look-angle changes, such as during turret tracking and acquisition operations, the turret compartment pressure will vary with time, and these pressure changes will propagate through the gas within the laser beam duct. Since typically a transverse conditioning gas flow is used in the laser beam duct (i.e., flow normal to the duct axis), the axial pressure gradient introduced by changes in turret compartment pressure can induce significant axial motion of the gas in the laser beam duct, and thereby lead to serious optical degradation.

Therefore, what is needed in the art and is presently not available is a means (e.g., an apparatus, system, or the like) for eliminating the aforementioned undesired, and optical degradation causing, axial flow of the conditioning gas.

SUMMARY OF THE INVENTION

The instant invention satisfies the above-mentioned need in the art. It, therefore, constitutes a significant advance in the state-of-the-art.

According to the invention, the undesired axial flow of the conditioning gas within the laser beam duct is eliminated during transient operation of the laser beam by matching the time rate of change of the pressure of the conditioning gas to the time rate of change of the pressure in the turret compartment.

Therefore, it is the principal object of this invention to provide an apparatus or system for eliminating the aforementioned undesired axial flow of the conditioning gas.

This principal object of the instant invention, as well as other objects related thereto (e.g., simplicity of structure, reliability of operation, and the like), will become readily apparent after a consideration of the description of the instant invention, together with reference to the contents of the single FIGURE of the drawing.

DESCRIPTION OF THE DRAWING

The drawing is a single FIGURE which depicts, in simplified schematic form, a preferred embodiment of the instant invention. In the interest of maintaining simplicity and clarity of the drawing, the FIGURE is partially in a side elevation view and partially in a top plan view. More specifically, the turret compartment is shown in the FIGURE in top plan view, while the remaining contents of the FIGURE are shown in side elevation view.

DESCRIPTION OF THE PREFERRED EMBODIMENT

As a preliminary matter, and with reference to the FIGURE of the drawing, it is to be noted and remembered that the instant invention is for use in maintaining a spatially uniform pressure in a flowing gas volume (generally designated 22) which is subjected to temporal pressure variations, where the flowing gas volume 22 flows transversely (i.e., across, from left to right of the reader) from a plenum chamber 110 into a laser beam duct 120 that is in communication with the plenum chamber 110, and also where the flowing gas volume 22 flows from the laser beam duct 120 into a rotatable compartment 140 (such as a rotatable turret of an aircraft) and also into an exhaust duct 130, with both the rotatable compartment 140 and the exhaust duct 130 being in communication with the laser beam duct 120, and also where the rotatable compartment 140 has a gas volume $V_T$ which is to be maintained at a preselected pressure $P_T$ and an aperture 142 which is exposed to an external pressure $P_A$, with a resultant pressure gradient being introduced by the changes in the pressure $P_T$ of the gas volume $V_T$ in the rotatable compartment 140, and thereby inducing significant undesired axial gas flow 22A motion in the laser beam duct 120 which can result in serious optical degradation. Most of this undesired axial gas flow 22A flows (perpendicularly) along the axis A–B of the laser beam duct 120, i.e., into the plane of the FIGURE of the drawing, as is indicated therein by a large dot. It is here to be noted that some of this undesired axial gas flow 22A also flows from the laser beam duct 120 to the rotatable compartment 140, as is also shown in the FIGURE.

Still with reference to the FIGURE of the drawing, therein is shown in simplified schematic form a preferred embodiment 10 of the instant invention. In the most basic and generic structural form, the preferred embodiment 10 comprises: a source 20 of a conditioning gas 22 that is under high pressure, with the source 20 being in communication with the plenum chamber 110; means (generally designated 30), interposed between and in communication with the plenum chamber 110 and with the source 20 of conditioning gas 22 under high pressure, for selectively allowing the conditioning gas 22 to flow from the source 20 into the plenum chamber 110, such that the gas 22 flows into the laser beam duct 120 and, a result, a laser beam duct pressure $P_D$ results; and means (generally designated 40), operably associated with the rotatable compartment 140, and with the laser beam duct 120, and also with the exhaust duct 130, for maintaining the laser beam duct gas flow pressure $P_D$ equal to the preselected pressure $P_T$ of the gas volume $V_T$ in the rotatable compartment 140.

The aforesaid means 30 for selectively allowing the conditioning gas 22 to flow from the source thereof 20 into the plenum chamber 110 includes a control valve 32 operably associated with the rotatable compartment 140 (by suitable conventional sensing linkage 144) and with the gas volume pressure $P_T$ therein, and also operably associated with and interposed between the source of conditioning gas 20 and the plenum chamber 110.

The means 40 for maintaining the laser beam duct gas flow pressure $P_D$ equal to the preselected pressure $P_T$ of the gas volume $V_T$ in the rotatable compartment 140 includes: means (generally designated 50), operably associated with the rotatable compartment 140 and with the laser beam duct 130, for sensing a difference in pressure between the gas volume pressure $P_T$ in the rotatable compartment 140 and the conditioning gas flow pressure $P_D$ in the laser beam duct 120; and, means (generally desingnated 60), operably associated with the differential pressure sensing means 50, for selectively delivering a supersonic flow $M_P$ of a stored primary gas 62 at a preselected pressure $P_P$, where this preselected pressure $P_P$ is sufficiently high to provide adequate pressure control of the laser beam duct pressure controller system 10, such that the preselected pressure of the gas volume $P_T$ in the rotatable compartment 140 is maintained.

This means 60 for selectively delivering a supersonic flow $M_P$ of the stored primary gas 52 at the preselected pressure $P_P$ includes: a source 64 of the stored primary gas 62; a nozzle 66, operably associated with the source 64 of the stored primary gas 62 and disposed in communication with and internal of the exhaust duct 130, with the outlet 66A of the nozzle 66 and the outlet 132 of the exhaust duct facing in the outboard direction, i.e., facing and venting overboard of the system 10; a selectively operable ejector valve 68, operably associated with and interposed between the source 64 of the primary gas 62 and the nozzle 66; and means (generally designated 70), operably associated with the selectively operable ejector valve 68 and the differential pressure sensing means 50, for controlling and operating the ejector valve 68 in response to a pressure difference sensed by the differential pressure means 50. This means 70 will hereinafter be referred to as the "ejector control".

MANNER AND USE OF THE PREFERRED EMBODIMENT

The manner of use, and of operation, of the preferred embodiment 10 of the instant inventon, as shown in the single FIGURE of the drawing, can be easily ascertained by any person of ordinary skill in the art from the foregoing description, coupled with reference to the contents of the FIGURE.

For others, the following explanation is given.

Succinctly, and as previously stated herein, the instant invention provides a structural means of eliminating the undesired axial flow of the conditioning gas 22A (both along laser beam duct axis A-B, into the plane of the drawing, and into the rotatable compartment, or aircraft external turret, 140) and, in fact, maintains a spatially uniform pressure within the laser beam duct 120 during transient operation by matching the time rate of change of pressure of the flowing conditioning gas 22 to the time rate of change of pressure in the turret 140.

More specifically, for a fixed "look" angle $\theta$ of the turret 140, the pressure $P_T$ in the cavity or void of the turret 140 operates, by suitable conventional sensing linkage 144, control valve 32 which feeds conditioning gas 22 from the high pressure source thereof 20 to the plenum chamber 110 at pressure $P_i$ and temperature $T_i$. The mass flow rate $M_i$ from the plenum 110 to the laser beam duct 120 is equal to $K_T$, where $K_T$ is a constant that depends on the characteristics of the control valve 32.

The mass flow $M_i$ enters the laser beams duct 120, such that, within the volume $V_D$ of the laser beam duct 120, the pressure $P_D$ and the temperature $T_D$ are uniform, and $P_D$ is equal to $P_T$. In addition, under steady state conditions, the exit mass flow $M_o$ is equal to $M_i$, and the conditioning gas 22 is exhausted overboard at pressure $P_E$. The value of $P_E$ is not critical and can range from the minimum $P_T$ to the maximum $P_T$. If necessary, the ejector 68 can be used to maintain a constant laser beam duct pressure $P_D$ during steady state operation.

During transient operations, the "look" angle $\theta$ and, consequently, $P_T$ will vary with time. Under this condition, the ejector 68 operates in a pulsed (i.e., on-off) mode and delivers a supersonic flow $M_P$ through the nozzle 66 which is in communication with and is internal of the exhaust duct 130. The flow rate $M_P$ of the primary gas 62 is given by $K_P P_P$, where $K_P$ is a constant determined by the characteristics of the ejector control 70, and where $P_P$ is based on the required performance of the system 10, and must be sufficiently large to provide adequate pressure control at the maximum $P_T$.

Still with reference to transcient operations, the ejector 68 is operated by ejector control 70 which senses the pressure difference $P_D - P_T$ from pressure difference sensing means 50 with which the ejector control 70 is operably associated. When $P_T$ is decreasing due to $P_A$, $P_D$ tends to lag (i.e., $P_D$ is greater than $P_T$), and the ejector 68 pulses on and off, inducing an exhaust flow $M_o$ which is greater than $M_i$, thereby reducing $P_D$ until $P_D$ is equal or less than $R_T$. It is here to be noted that the pulse rate of the ejector 68 is sufficiently rapid that, due to the lag in the response of the system 10, continuous and essentially uniform flow is maintained through the laser beam duct 120. On the other hand, when $P_T$ is increasing, the ejector 68 turns off; and, control valve 32 provides increasing $M_i$, so that $P_D$ tends to equal $P_T$. This operation provides pressure control within an allowable error (i.e., $P_T - P_D$) less than one torr for slew rates slower than 0.3 rad/sec. For faster rates, pressure balance is not required, since optical quality is generally unnecessary during rapid slew operations, particularly if the recovery time at the completion of the maneuver is relatively short (i.e., less than one second).

CONCLUSION

It is abundantly clear from all of the foregoing, and from the contents of the FIGURE of the drawing, that the stated principal object of the instant invention, as well as other objects related thereto, have been achieved.

It is to be noted that, although there has been described and shown the fundamental features of the instant invention, as applied to a preferred embodiment 10 thereof, nevertheless various other embodiments, variations, substitutions, additions, omissions, and the like may occur to, and can be made by, those of ordinary skill in the art.

What is claimed is:

1. A laser beam duct pressure controller system for maintaining a spatially uniform pressure in a flowing gas volume subjected to temporal pressure variations, wherein said flowing gas volume flows transversely from a plenum chamber into a laser beam duct in communication with said plenum chamber, and wherein some of said flowing gas volume flows from said laser beam duct into a rotatable compartment and most of said flowing gas volume flows into an exhaust duct, both of which are in communication with said laser beam duct, and also wherein said rotatable compartment has a gas volume which is to be maintained at a preselected pressure and an aperture which is exposed to an external pressure, whereby a resultant pressure gradient is introduced by changes in said pressure of said gas volume in said rotatable compartment, and thereby inducing significant undesired axial gas flow motion in said laser beam duct which can result in serious optical degradation, said laser beam duct pressure controller system comprising:

a. a source of conditioning gas under high pressure in communication with said plenum chamber;
  b. means, interposed between and in communication with said plenum chamber and said source of conditioning gas under high pressure, for selectively allowing said conditioning gas to flow from said source thereof into said plenum chamber, whereby said gas flow feeds into said laser beam duct, and thereby a laser beam duct pressure results; and
  c. means, operably associated with said rotatable compartment, and with said laser beam duct, and also with said exhaust duct, for maintaining said laser beam duct gas flow pressure equal to said preselected pressure of said gas volume in said rotatable compartment, whereby said undesired axial gas flow motion in said conditioning gas in said laser beam duct is eliminated.

2. A laser duct pressure controller system, as set forth in claim 1, wherein said means for selectively allowing said conditioning gas to flow from said source thereof into said plenum chamber includes a control valve operably associated with said rotatable compartment and with the gas volume pressure therein, and also operably associated with and interposed between said source of conditioning gas and said plenum chamber.

3. A laser beam duct pressure controller system, as set forth in claim 2, wherein said means for maintaining said laser beam duct gas flow pressure equal to said preselected pressure of said gas volume in said rotatable compartment includes:

a. means, operably associated with said rotatable compartment and with said laser beam duct, for sensing a difference in pressure between said gas volume pressure in such rotatable compartment and said conditioning gas flow pressure in said laser beam duct; and
  b. means, operably associated with said differential pressure sensing means, for selectively delivering a supersonic flow of a stored primary gas at a preselected pressure, wherein said preselected pressure is sufficiently high to provide adequate pressure control of said laser beam duct pressure controller system such that said preselected pressure of said gas volume in said rotatable compartment is maintained, and wherein this means for selectively delivering a supersonic flow of said stored primary gas at a preselected pressure includes:
     a source of said stored primary gas;
     a nozzle, operably associated with said source of stored primary gas and disposed in communication with and internal of said exhaust duct, with the outlet of said nozzle and the outlet of said exhaust duct facing in the outboard direction;
     a selectively operable ejector valve, operably associated with and interposed between said source of primary gas and said nozzle; and
     means, operably associated with said selectively operable ejector valve and with said differential pressure sensing means, for controlling and operating said ejector valve in response to a pressure difference sensed by said differential pressure sensing means;

whereby when the pressure of said gas volume in said rotatable compartment falls below said conditioning gas flow pressure in said laser beam duct, said means for controlling and operating said ejector valve in response to said difference in pressure, which has been sensed by said differential pressure sensing means, causes said ejector valve to pulse on-and-off, thereby inducing a supersonic flow of said stored primary gas through said nozzle and into said exhaust duct, resulting in an increased exhaust flow of said conditioning gas until said pressure of said conditioning gas in said laser beam duct is equal to or less than said pressure of said gas volume in said rotatable compartment, and thereby eliminating said undesired axial gas flow in said laser beam duct and thus attaining and maintaining a spatially uniform pressure in the gas volume flowing in this system, despite temporal pressure variations.

4. A laser beam duct pressure controller system, as set forth in claim 3, wherein:

a. said rotatable compartment is a turret of an aircraft, and is located external thereof;
  b. said system is an airborne system; and
  c. said exhaust duct leads outboard of said aircraft.

* * * * *